United States Patent
Bindana et al.

(10) Patent No.: US 11,797,767 B2
(45) Date of Patent: *Oct. 24, 2023

(54) METHODS AND SYSTEMS FOR GENERATING MULTIPLE SCANNED FILES BASED ON KEYWORDS

(71) Applicant: XEROX CORPORATION, Norwalk, CT (US)

(72) Inventors: Srinivasarao Bindana, Kakinada (IN); Dara N Lubin, Pittsford, NY (US); Madhu Talapaneni, Gangadhara Nellore Mandal (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/235,137

(22) Filed: Apr. 20, 2021

(65) Prior Publication Data

US 2022/0335218 A1    Oct. 20, 2022

(51) Int. Cl.
- *G06F 40/00* (2020.01)
- *G06F 40/279* (2020.01)
- *G06F 40/166* (2020.01)
- *G06F 40/205* (2020.01)

(52) U.S. Cl.
CPC .......... *G06F 40/279* (2020.01); *G06F 40/166* (2020.01); *G06F 40/205* (2020.01)

(58) Field of Classification Search
CPC ..... G06F 40/279; G06F 40/166; G06F 40/205
See application file for complete search history.

(56) References Cited

U.S. PATENT DOCUMENTS

| | | | |
|---|---|---|---|
| 7,391,527 B2 * | 6/2008 | Irwin | H04N 1/00127 382/229 |
| 10,956,107 B1 | 3/2021 | Gopalakrishnan et al. | |
| 2005/0042009 A1 * | 2/2005 | Roztocil | G06F 3/1205 400/62 |
| 2005/0195446 A1 | 9/2005 | Kasatani | |
| 2006/0109523 A1 * | 5/2006 | Hamilton | H04N 1/00209 358/468 |
| 2010/0118350 A1 | 5/2010 | Allwright et al. | |
| 2010/0131551 A1 * | 5/2010 | Benzaken | G06F 21/6245 715/810 |
| 2010/0235727 A1 * | 9/2010 | Ashton | H04L 9/3255 715/253 |
| 2012/0327482 A1 * | 12/2012 | Takishima | H04N 1/32037 358/402 |

(Continued)

*Primary Examiner* — Scott T Baderman
*Assistant Examiner* — Barbara M Level
(74) *Attorney, Agent, or Firm* — JONES ROBB, PLLC

(57) ABSTRACT

The present disclosure discloses methods and systems for generating multiple scanned files when scanning a document. The method includes receiving a document for scanning from a user. Once received, a user interface is displayed to the user to input one or more keywords based on which multiple scanned files are to be generated. A single scanned file is generated in a pre-defined format. One or more pages having the keywords as input by the user are identified from the scanned file. Based on the one or more identified pages having the keywords input by the user, separate multiple scanned files are automatically generated. As a result, a single scan activity performed by the user generates multiple scanned files.

16 Claims, 18 Drawing Sheets

(56) References Cited

U.S. PATENT DOCUMENTS

| | | | |
|---|---|---|---|
| 2016/0042229 A1* | 2/2016 | Liao | H04N 1/2166 |
| | | | 358/403 |
| 2018/0225508 A1* | 8/2018 | Lea | G06V 10/48 |
| 2018/0278794 A1* | 9/2018 | Nguyen | H04L 63/0861 |
| 2021/0105369 A1* | 4/2021 | Diasti | H04N 1/00737 |
| 2022/0166896 A1* | 5/2022 | Sadowara | H04N 1/00461 |

\* cited by examiner

METHODS AND SYSTEMS FOR GENERATING MULTIPLE SCANNED FILES BASED ON KEYWORDS

TECHNICAL FIELD

The present disclosure relates to the field of scanning. More specifically, the disclosure relates to methods and systems for generating multiple scanned files based on keywords.

BACKGROUND

Multi-function devices (MFDs) have become quite common and essential in our day-to-day life. A user willing to share an e-copy of a document with other users scans the document at the multi-function device and shares the scanned document with the other users. Sometimes there can be scenarios when a user scanning a document wishes to split the document into two or more files. This may happen as the user is required to share a few pages of the document with one user and other pages of the document with another user. For example, a user who is scanning a book may require sharing one chapter of the book with a first person and another chapter of the book with a second person. In such cases, the user scans the two chapters independently as two scan activities and shares the respective chapters with the two people. This is time consuming and requires significant effort of the user. There can be other scenarios where a user may be required to split pages of a document into two or more files. For example, a user scanning an official document may require splitting the pages with a signature as a separate file while keeping the other pages as a separate file.

Currently, in such scenarios, the user is required to, first, manually segregate the documents into separate documents by identifying required pages and then scan them separately. This could be very frustrating and time-consuming. Also, this is prone to errors, as the user might make some mistakes while segregating, scanning, or sharing them separately. In this light, there is a need for improved methods and systems to address the above-mentioned problems.

SUMMARY

According to aspects illustrated herein, there is a method for generating multiple scanned files based on keywords when scanning a document. The method is implemented at a multi-function device. The method includes receiving a document for scanning from a user. A user interface is provided to the user to input one or more keywords based on which multiple scanned files are to be generated. A single scanned file is generated in a pre-defined format. Based on the one or more input keywords, one or more pages from the scanned file having the one or more keywords are identified. Based on the identified pages having the one or more keywords input by the user, separate multiple scanned files are automatically generated. This way, multiple scanned files are generated as an outcome of a single scan activity by the user.

According to further aspects illustrated herein, a multi-function device for generating multiple scanned files based on keywords when scanning a document is disclosed. The multi-function device includes a receiver for receiving a document for scanning from a user. The multi-function device includes a user interface for allowing the user to input one or more keywords based on which multiple scanned files are to be generated. A scanner is included for scanning the document and generating a single scanned file in a pre-defined format. The multi-function device also includes a controller for automatically generating at least two scanned files from the single scanned file, based on the one or more input keywords.

According to furthermore aspects illustrated herein, there is a method for allowing a user to generate multiple scanned files when scanning a document at a multi-function device. The method includes receiving a document for scanning from a user. Once received, a user interface is provided to the user to input one or more keywords based on which multiple scanned files are to be generated. A scanned file is generated in a pre-defined format. Based on the one or more input keywords, one or more pages having the input keywords are identified from the single scanned file. The one or more pages having the one or more keywords are segregated from the remaining pages of the single scanned file. At least two separate scanned files are automatically generated, where one scanned file includes the one or more pages having the one or more keywords input by the user and another scanned file includes the remaining pages of the single scanned file. Once generated, the user is allowed to send the generated at least two scanned files to one or more destinations.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

DESCRIPTION

Figure 1:
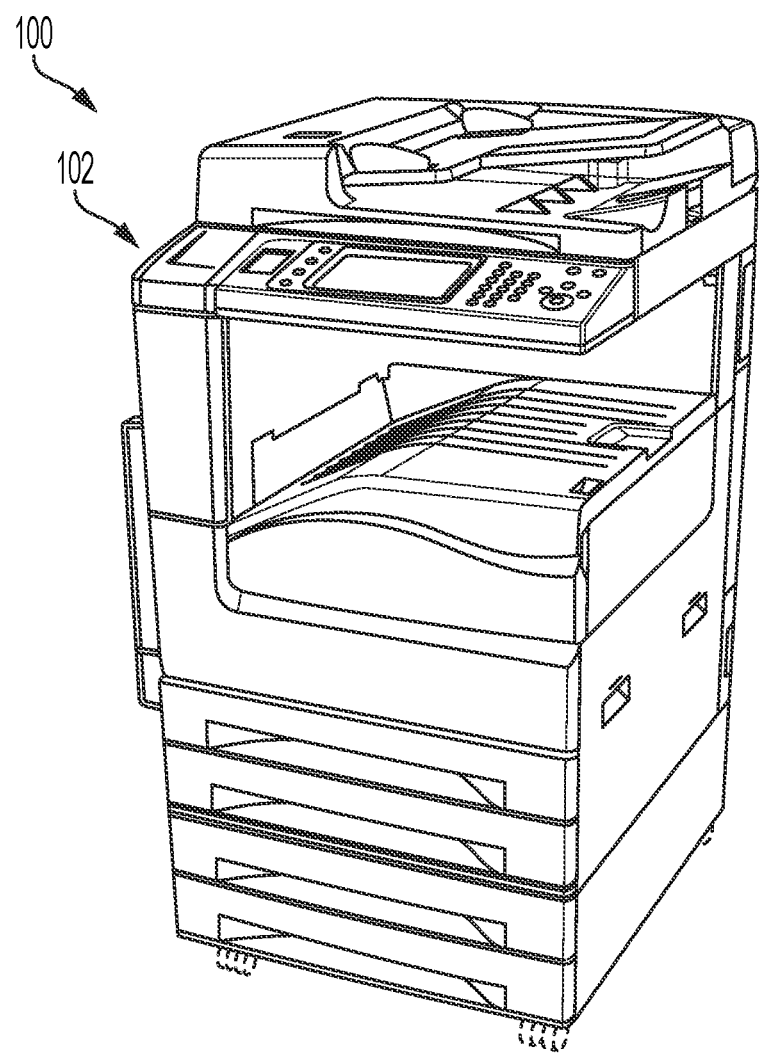
FIG. 1 shows an exemplary environment in which various embodiments of the present disclosure can be practiced.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

In various embodiments of the present disclosure, definitions of one or more terms that will be used in the document are provided below. For a person skilled in the art, it is understood that the definitions are provided just for the sake of clarity and are intended to include more examples in addition to the examples provided below.

The term "multi-function device" is a single device or a combination of multiple devices, to perform one or more functions such as, but not limited to, printing, imaging, scanning, copying, imaging, or the like. The multi-function device may include software, hardware, firmware, and a combination thereof. In the context of the current disclosure, the multi-function device generates multiple scanned documents when scanning a document. The multi-function device generates the multiple scanned documents based on one or more keywords input by a user.

The term "document" refers to a document having one or more pages. The document is submitted for scanning at the multi-function device by a user.

The term "single scanned file" refers to a file that is generated after scanning the document. In context of the present disclosure, the single scanned file is a temporary file in a searchable file format. The single scanned file is searched for identification of one or more keywords input by the user. The single scanned file is segregated into multiple scanned files based on the identification of one or more keywords.

The term "keywords" refer to one or more keywords input by the user when scanning the document. The keywords may be in the form of text, alphabets, numeric, alphanumeric, image, graphics, or a combination of these. In context of the current disclosure, based on the one or more keywords input by the user, the single scanned file is searched to identify pages including matching keywords. Based on the identification, the pages including matching keywords are segregated from the remaining pages, thereby multiple scanned files are generated.

The term "matching" refers to the one or more keywords that are either exact same or related to the one or more keywords input by the user. For example, if a keyword input by the user is 'Image', some of the matching keywords can be 'Image', 'Images', 'Pictures', 'Figures' and so on. In context of the present disclosure, when the user inputs one or more keywords while scanning the document, one or more pages including the matching keywords are identified. Based on the identified pages, multiple scanned files are generated. The matching keywords can be acronyms, synonyms, substitutions, short forms, or keywords that are associated to the input keywords, e.g., short names related to the input keyword, substitutions, or shortcuts set forth by a user.

The term "multiple scanned files" refer to one or more scanned files that are generated as a result of scanning the document. The multiple scanned files can include any combination of files, which depends on the one or more keywords input by the user. For instance, a user scanning a 10-page document can segregate the document into two scanned files—a first file including a keyword 'signature' and a second file including remaining pages that do not include the keyword. In this example, the document is first scanned to generate a single scanned file that is searched to identify pages including the keyword 'signature'. If the document includes 2 pages having the keyword, the document is segregated into—a first scanned file including the 2 pages and a second scanned file including remaining 8 pages.

The term "segregating the one or more pages" refers to separating one or more pages of the document from remaining of the pages of the document. The segregation of one or more pages is done based on the input one or more keywords. For example, if a user input a keyword "confidential" while scanning a document, then one or more pages of the document including the keyword are segregated from the pages that do not include the keyword.

Overview

The present disclosure discloses methods and systems to automatically generate multiple scanned files when scanning a document. The methods and systems propose a new feature to scan a document submitted by a user and generate multiple scanned files as an output. The feature allows generation of multiple scanned files based on keywords input by the user. Unlike conventional methods and systems, the user is not required to manually segregate one or more pages of the document to generate multiple scanned files. Therefore, the present disclosure provides an easy approach to segregate a single document into multiple scanned files when the document is scanned.

The methods and systems allow the user to enter one or more keywords based on which pages including the input keywords are identified and multiple scanned files are generated as the result of single scan activity. For example, if a user is scanning a physics book, he can segregate a chapter on optics by providing an input keyword 'Optics' while scanning the book. The methods and systems allow the users to generate two scanned files as an output of scanning—one including the keyword 'optics' and another including the remaining pages that do not include the keyword optics. This way the present disclosure saves user's time and effort in creating multiple scanned files from a single document.

Exemplary Environment

FIG. 1 shows an exemplary environment 100 in which various embodiments of the disclosure can be practiced. The environment 100 includes a multi-function device 102. Various examples of the multi-function device 102 may be a printer, a scanner, a multi-function peripheral device, or the like. The multi-function device 102 provides one or more functionalities such as printing, scanning, imaging, copying, and so on. In context of the present disclosure, the multi-function device 102 allows a user to generate multiple scanned files by scanning a single document. The multi-function device 102 allows the user to input one or more keywords when scanning the document such that the document is segregated into multiple scanned files based on the input keywords.

In operation, a user wishes to scan a document having one or more pages. The user submits the document at the multi-function device 102 for scanning. Once submitted, the multi-function device 102 provides an option to segregate the document into multiple scanned files. The user selects the option such that selecting the option allows the user to input one or more keywords. Based on the input one or more keywords, the multi-function device 102 identifies one or more pages of the document having the input one or more keywords. Subsequently, the multi-function device 102 automatically generates multiple scanned files based on the identified one or more pages having the keywords. The generated multiple scanned files may include and/or exclude the input one or more keywords. For example, a user may submit a 10-page document for scanning. The user inputs a keyword 'signature' and selects an option to generate two scanned files—a first scanned file including pages identified to include the input keyword 'signature' and a second scanned file excluding the input keyword 'signature'. In another example, the user may select an option to generate two scanned files each including a different set of keywords. This way, the multi-function device 102 scans a document and segregates the document to generate multiple scanned files based on user's input.

Exemplary Multi-Function Device

Figure 2:
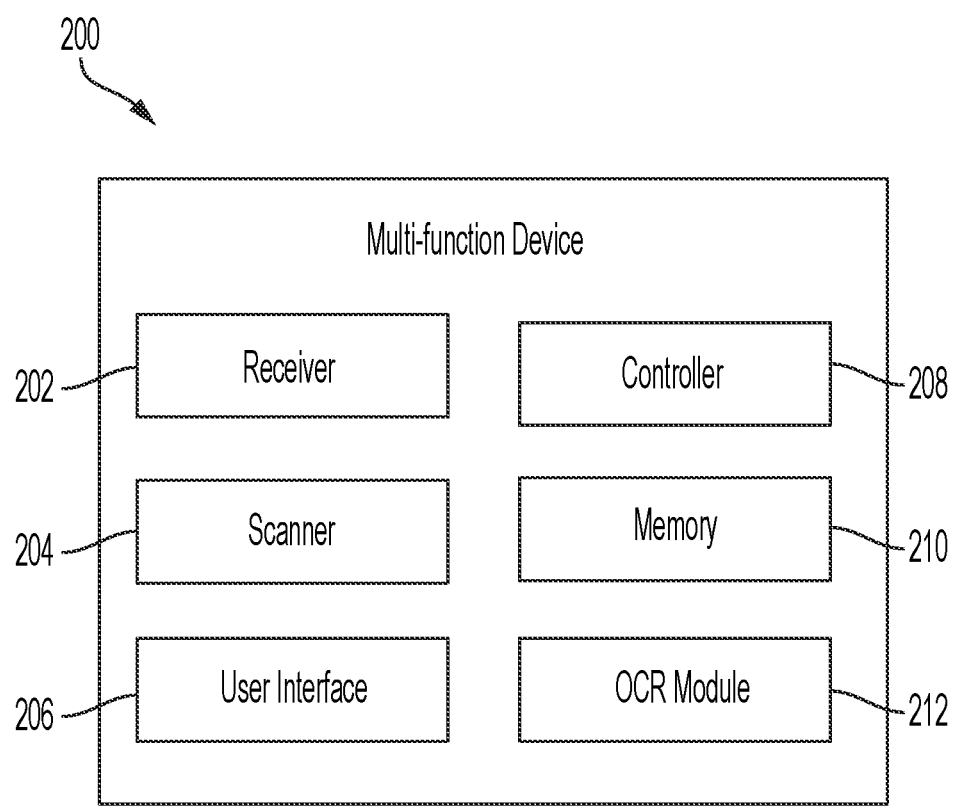
FIG. 2 is a block diagram illustrating a multi-function device and its components, in accordance with an embodiment of the present disclosure.

FIG. 2 is a block diagram illustrating various components of a multi-function device 200 for implementing the current disclosure. As shown, the multi-function device 200 includes a receiver 202, a scanner 204, a user interface 206, a controller 208, a memory 210, and an Optical Character Recognition (OCR) module 212. The components 202-212 are connected to each other via a conventional bus or a later developed protocol. And the components 202-212 communicate with each other for performing various functions of the present disclosure. The multi-function device 200 may further include additional component(s) as required to implement the present disclosure. Also, the multi-function device 200 may perform functions and operations similar to the multi-function device 102 of FIG. 1.

The implementation begins when a user wishes to scan a document having one or more pages. Here, the user also wishes to generate multiple scanned files as an output of scanning the document. The user submits the document at the multi-function device 200 for scanning. Upon submission, the receiver 202 receives the document. The receiver 202 can include any automatic document feeder (ADH) or a manual document feeder. For example, the receiver 202 can be Duplex Automatic Document Feeder (DADH) that receives the document and automatically feeds the document to the scanner 204 when the scanning is initiated. Those skilled in the art will appreciate that other types of receiver 202 can also be used without departing from the scope of the present disclosure.

Figure 3A:
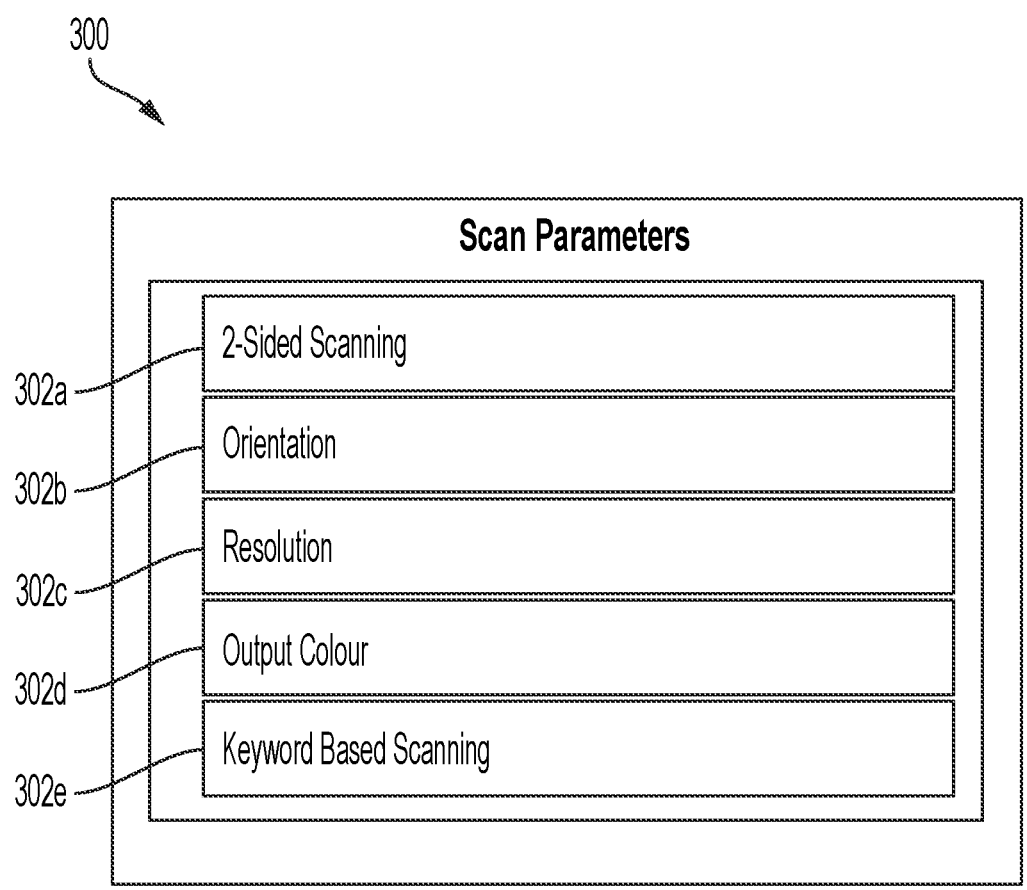
FIGS. 3A-3E are exemplary snapshots illustrating implementation of the present disclosure.

Once the document is received, the user submits a scan command via the user interface 206. Once submitted, the user interface 206 displays various scan parameters to the user for his selection. Exemplary scan parameters can be single/double-sided scanning, orientation of scan, resolution, and the like. In context of the current disclosure, an additional scan parameter is included that, when selected by the user, allows generation of multiple scanned files from scanning of the document. One exemplary user interface 300 including such a scan parameter is shown in FIG. 3A. As illustrated, the user interface 300 displays the conventional scan parameters such as '2-sided scanning' 302a, orientation 302b, resolution 302c, and output colour 302d. The user interface 300 also includes a scan parameter 'keyword-based scanning' 302e that allows the user to input one or more keywords. The 'keyword-based scanning' 302e parameter allows the user to input one or more keywords based on which the document can be segregated into multiple scanned files.

In general, where the user wishes to scan the document to create a single output file, the user selects one or more of scan parameters such as 302a-302d and initiates scanning. However, in scenarios, where the user wishes to split/segregate the document into two or more output/scanned files, the user selects the parameter 'keyword-based scanning' 302e.

Once the user selects the 'keyword-based scanning' 302e parameter, another user interface is displayed to the user that allows the user to enter one or more keywords based on which the segregation is to be performed. The keyword can be a text such as alphabets, numbers, alphanumeric text, special characters, and so on. The keyword can also be an image such as signature, logo, or the like.

Figure 3B:
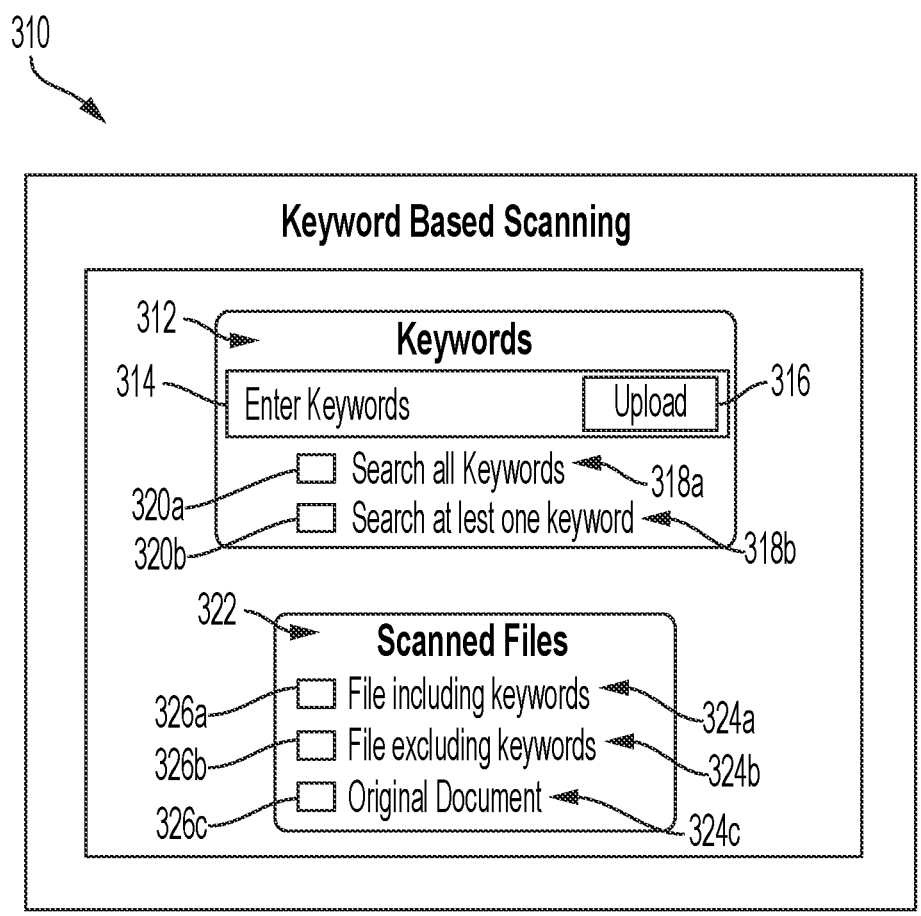

One exemplary user interface 310 that is presented to the user upon selecting the 'keyword-based scanning' parameter is shown in FIG. 3B. As shown, the user interface 310 includes an option to input one or more keywords (marked as 312) and another option to select one or more scanned files (marked as 322) that are to be generated based on the input keywords. The option 312 allows the user to enter/input one or more keywords. Here, the user can either type the keywords in a blank box (marked as 314) or upload the input keywords by clicking on an 'upload' button (marked as 316). The option 312 also allows the user to search all the input keywords (marked as 318a) or search at least one keyword (marked as 318b) in the document. For example, if a user is scanning a document related to anatomy and wishes to segregate the pages based on availability of keywords related to spinal cord (e.g., 'spine', 'spinal cord', 'vertebrae'), he can select the option to search all the keywords 318a. In this case, use selects the option 318a by checking a checkbox 320a provided corresponding to the option 318a. In another scenario, where the user wishes to segregate the document based on availability of at least one of the input keywords, he checks another checkbox 320b that is provided corresponding the option 318b.

The user interface 310 also provides the option to select one or more scanned files that are to be generated (marked as 322) based on the input keywords. As shown, the option 322 provides following sub-options to generate multiple scanned files—a) generate a scanned file including the input keywords (marked as 324a), b) generate a scanned file excluding the input keywords (marked as 324b), and c) generate a scanned file that is similar to the originally submitted document (marked as 324c). The user can select a corresponding checkbox (marked as 326a 326b, 326c) to select one or more of the sub-options 324a-324c. Here, the option 324c refers to the scanned document that includes all the pages in an order same as that of the original document that is submitted for scanning. Further, the user can select more than two options (324a-324c) while generating multiple scanned files from the document.

This way, the user interface 310 allows the user to choose any combination of sub-options 318a-318b, 324a-324c to generate multiple scanned files based on user's input. For instance, if the user wishes to generate a scanned file excluding pages having all the input keywords, the user selects the sub-options 318a and 324b. If the user wishes to generate a file including all the keywords, he selects the sub-options 318a and 324a. These are just examples and the user interface 310 can include any suitable sub-options to generate multiple scanned files based on user's input.

Once the user selects the one or more keywords and the multiple scanned files to be generated, the scanner 204 initiates the scanning process. The scanner 204 scans the document to generate a single scanned file in a pre-defined format. The single scanned file is a temporary scanned file that is to be used to generate multiple scanned files based on the input one or more keywords. The single scanned file is temporarily stored in the memory 210. The single scanned file is an image file that is generated by scanning the document. The single scanned file is in any suitable pre-defined format including, but not limited to, .JPEG, .JPG, .PNG, or .TIFF.

Once the single scanned file is generated, the controller 208 initiates processing of the single scanned file. As the single scanned file is in a non-searchable format (e.g., JPEG file format), the single scanned file is first converted to a searchable format. In the present disclosure, the Optical Recognition Module (OCR) module 212 converts the single scanned file to a searchable format (e.g., MS word format). Once converted, the OCR module 212 identifies one or more matching keywords from the single scanned file based on the input one or more keywords. While the OCR module 212 is used to identify the matching keywords from the single scanned file, the controller 208 may include the functionality of converting the single scanned file to the searchable format for identifying the one or more matching keywords from the single scanned file.

Once the matching keywords are identified, the controller 208 identifies one or more pages of the single scanned file having the one or more matching keywords. For instance, if one or more keywords input by the user are 'optics' and 'rays', the controller 208 identifies the page number of the document including these two keywords or other matching keywords such as synonyms, acronyms, and short names related to the keywords, shortcuts or names set forth by the user and so on. Some of the matching keywords that may be identified includes 'optical', 'beam', 'light', 'radiation', etc.

Subsequently, the controller 208 segregates the pages having the one or more keywords from the remaining pages of the document. For example, if in a 20-page document, the keywords 'optics' and 'rays' are identified to be present on page numbers 4-6, the controller 208 segregates page number 4,5,6 from the page numbers 1-3, 7-20. At this stage, depending on user's inputs, the controller 208 combines the page numbers 4-6 having the keywords to generate a first scanned file and combines the remaining pages 1,2,3,7-20 to generate a second scanned file. In cases, where the user selected the option to exclude pages having the input keywords, the controller 208 removes the page numbers 4-6 and generates only one scanned file including page numbers 1,2,3,7-20. This way, multiple scanned files are generated based on user's input keywords. The present disclosure can be used to generate any suitable multiple scanned files without departing from the scope.

Figure 3C:
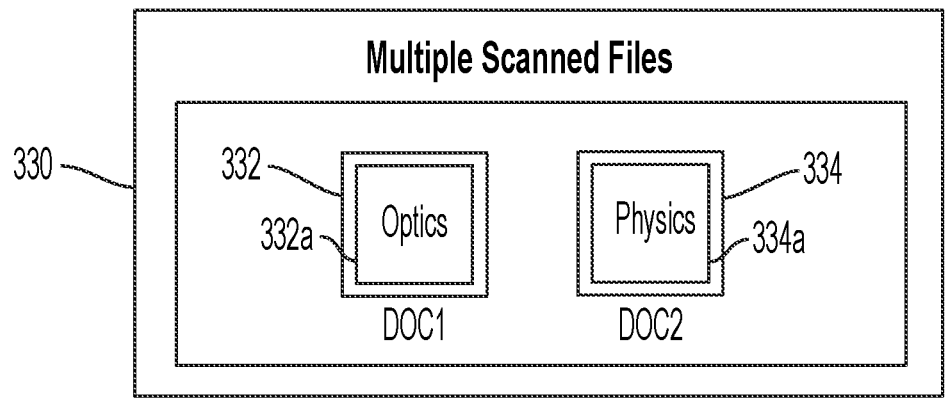

Subsequently, a preview of the multiple scanned files is displayed to the user via the user interface 206. The preview may include thumbnail for each of the multiple scanned files. The thumbnails can be created based on information related to the corresponding scanned files. For example, the thumbnail of each scanned file may include set of keywords used to create the file, file size, and so on. The preview/thumbnail is presented to assist the user in easy identification of the multiple scanned files. In some cases, the user can also access the individual scanned file by clicking on its thumbnail. This way, the user can identify the multiple scanned files. One exemplary user interface 330 showing the preview of multiple scanned files is shown in FIG. 3C. As illustrated, the user interface 330 includes preview of two scanned files (marked as 332 and 334) generated after scanning a document. As shown, a thumbnail 332a of the scanned file 332 includes a keyword 'Optics' and a thumbnail 334a of the scanned file 334 includes a keyword 'Physics'. Here, the thumbnails 332a and 334a represents the keywords based on which the two scanned files 332 and 334 are created, respectively.

Figure 3D:
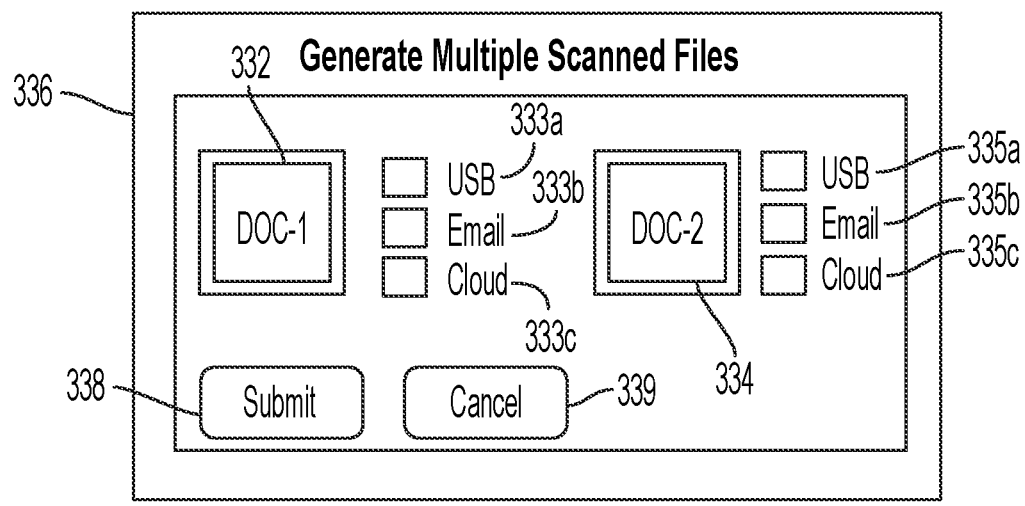

Subsequently, the user then selects one or more of the multiple scanned files 332 and 334 and perform a desired action. For instance, the user can share the one or more of the scanned files with one or more users via email. Further, the user can store the one or more of the scanned files in a USB drive connected to the multi-function device 200. Also, the user can save the one or more of the individual scanned files at a desired cloud location that can be accessed at the multi-function device 200. One such exemplary user interface 336 is shown in FIG. 3D. As illustrated, the user interface 336 displays the generated scanned files 332 and 334. Further, each scanned file is provided with one or more sharing options. For example, the scanned file 332 includes sharing options such as USB 333a, Email 333b, and Cloud 333c. And the scanned file 334 includes similar options including USB 335a, Email 335b, and Cloud 335c. Once the user selects the desired sharing option, the user submits (marked as 338) his selection to send the files 332 and 334 at selected destinations. The user may cancel (marked as 339) anytime to terminate the email sending process.

The memory 210 stores all relevant information required for implementing the current disclosure. For example, the memory 210 temporarily stores scan parameters provided by the user. Any details stored in the memory 210 may be retrieved by the controller 208, OCR module 212 or other components for implementing the current disclosure.

FIG. 2 is explained with respect to a scenario in which the user scans a document having one or more pages to obtains one or more scanned files based on user selected keywords. In the discussed scenario, the scanned files are generated to either include or exclude a common set of keywords input by the user. However, there can be a scenario where the user wishes to generate multiple scanned files based on mutually exclusive set of keywords. For instance, the user may wish to generate a first scanned file that includes a first set of keywords, say 'confidential' and 'client', and the user may wish to obtain a second scanned file that includes a second set of keywords, say 'signature' and 'sign'.

Figure 3E:
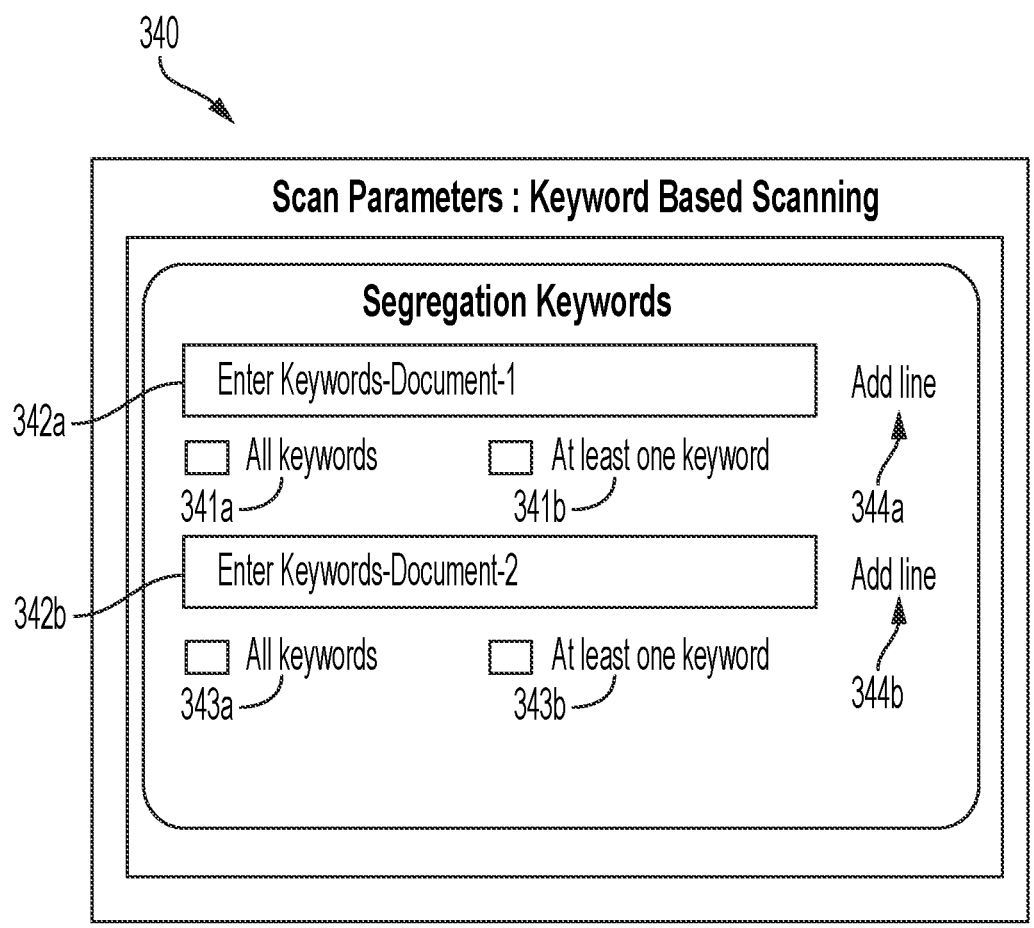

In the above scenario, once the user selects the keyword-based scanning option, the user interface 206 allows the user to enter multiple set of keywords. One such exemplary user interface 340 allowing the user to input multiple set of keywords is shown in FIG. 3E. The user interface 340 is presented to the user once the user selects the keyword-based scanning option. As illustrated, the user interface 340 includes blank boxes (marked as 342a and 342b) that allow the user to enter two desired set of keywords. For example, the user can input keywords 'sign' and 'signature' in the blank box 342a and selects an option (marked as 341b) to identify pages having at least one of the input keywords. Here, the user can directly input the signature through the user interface of the multi-function device or can upload the signature at the multi-function device. If the user wishes to search for pages including both the keywords, he can select the other option (marked as 341a). Similarly, the user enters keywords 'PAN' and 'Passport' in the second blank box 342b and selects an option of searching pages including both the keywords (marked as 343a). The user can select the option 343b to select pages having matching keywords for either of the two input keywords. This way, the user can user two set of keywords to identify pages in the submitted document, when scanning. Further, the user interface 340 includes add line option (marked as 344a and 344b) provided next to each blank box. The add line option (344a and 344b) allows the user to enter a new line and enter additional set of keywords. This is just an example and the user interface can be displayed in any suitable format that allows the user to generate multiple scanned files based on different set of input keywords.

Exemplary Snapshots

FIGS. 4A-4K show exemplary snapshots of a user interface that are displayed to a user while implementing the present disclosure. In particular, FIGS. 4A-4E are snapshots of the user interface displayed when the user scans the document via a 'workflow scanning' feature at a multi-function device, whereas FIGS. 4F-4K are snapshots of the user interface displayed when the user scans the document using an 'Email' feature of the multi-function device. In the former scenario, the user scans the document to store the generated multiple scanned files at a laptop, a server, and so on, whereas in the latter scenario, the user scans the document to email the generated multiple scanned files to one or more email recipients. Both the scenarios can be implemented at the multi-function device 200 of FIG. 2.

Figure 4A:
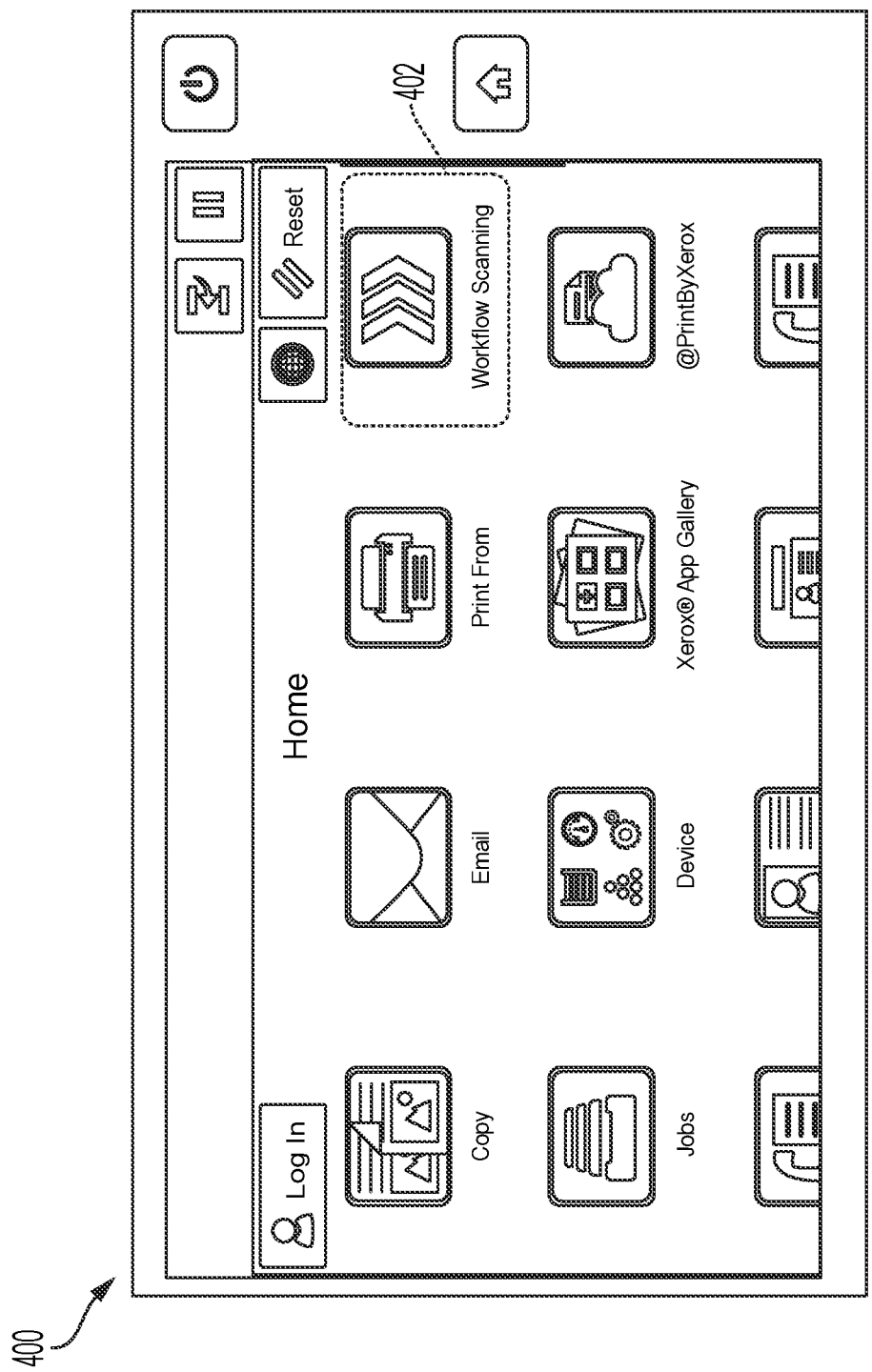
FIGS. 4A-4K are exemplary snapshots of user interface presented to a user while implementing the present disclosure.
Figure 4B:
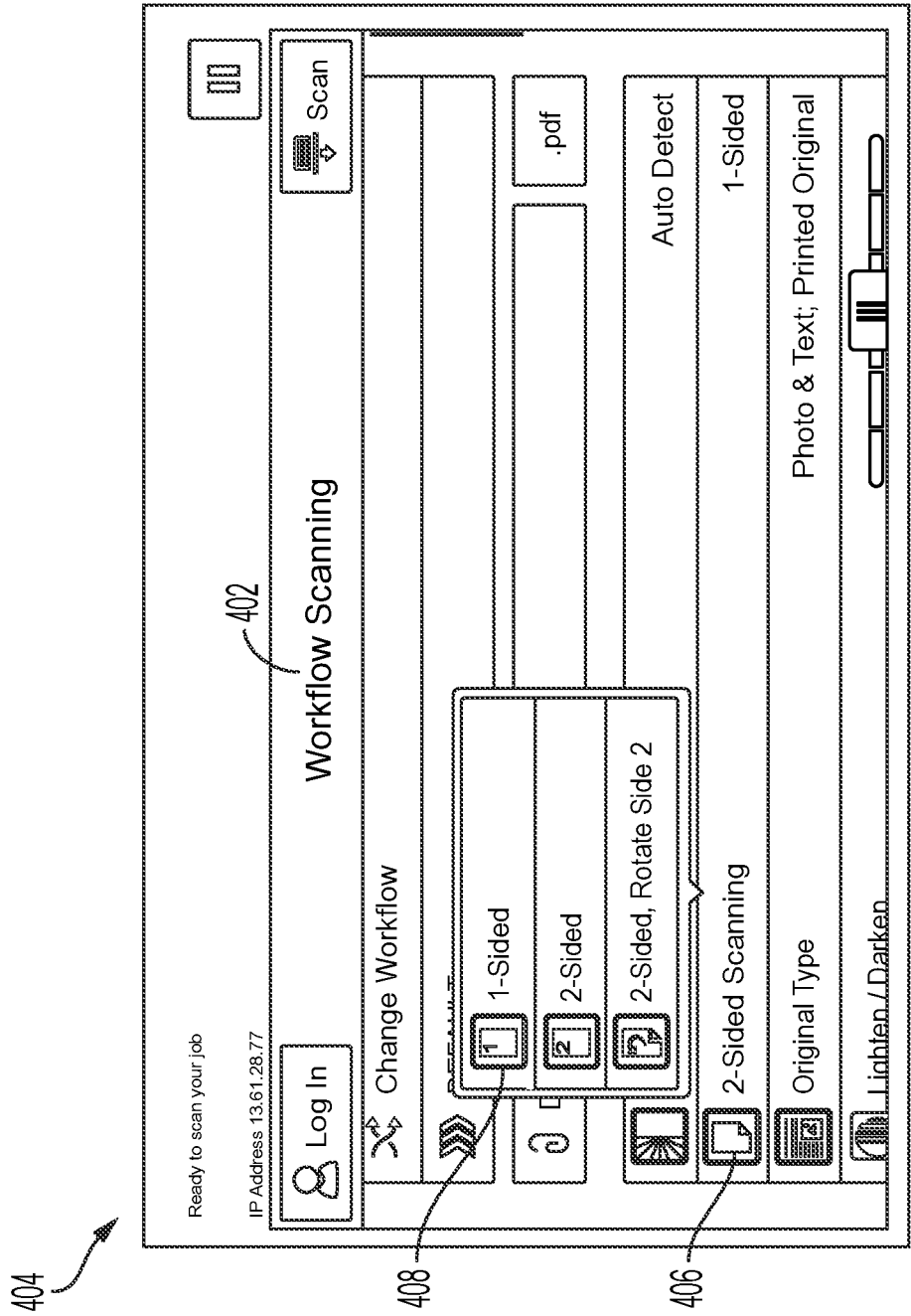
Figure 4C:
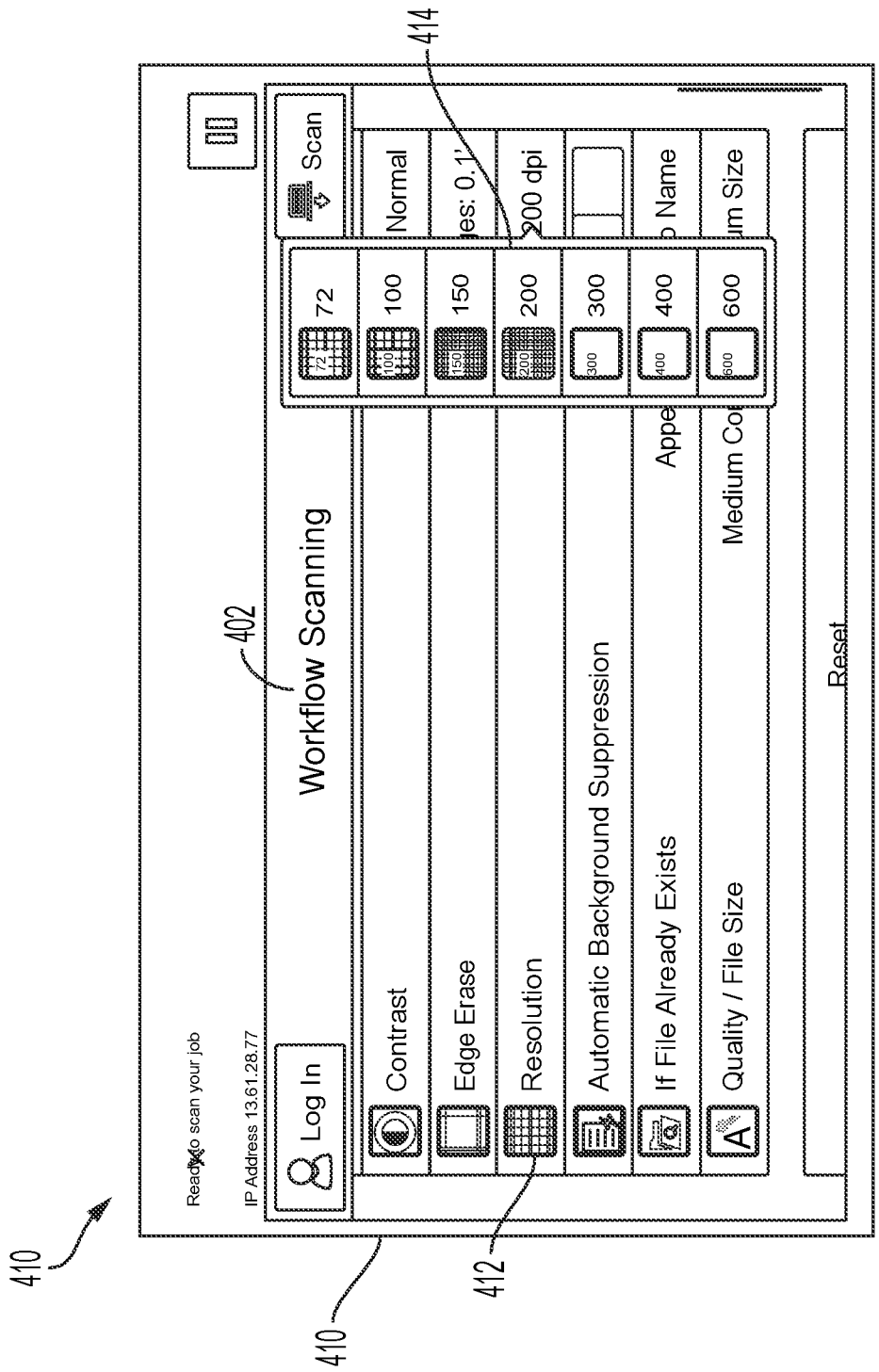
Figure 4D:
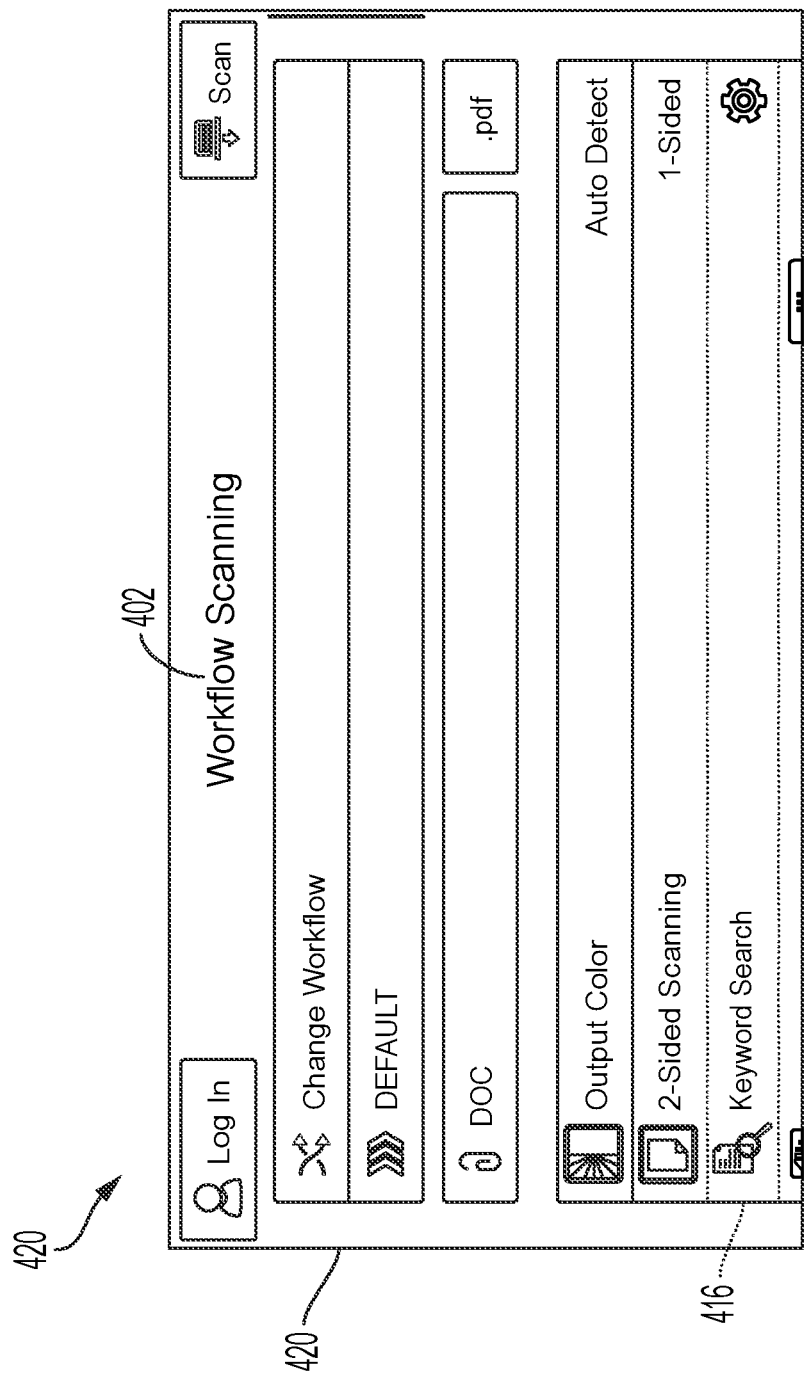
Figure 4E:
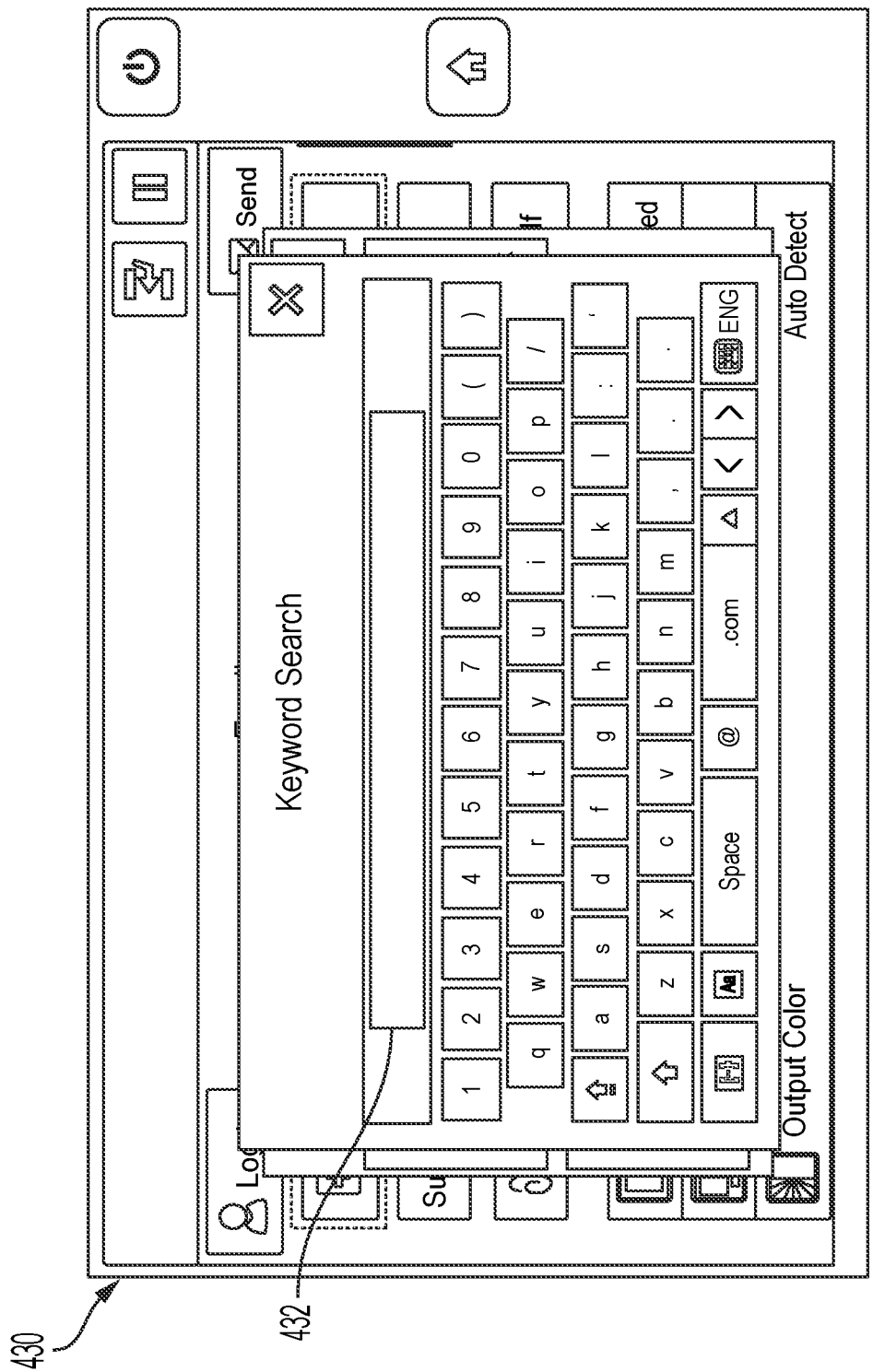

Referring to the first scenario, where the user wishes to scan the document and store the generated multiple scanned files to a laptop connected to the multi-function device through a network, a user interface 400 displaying various features or applications is shown to the user (as shown in FIG. 4A). The user selects a 'workflow scanning' feature (marked as 402). Subsequently, another user interface 404 displaying various scan parameters is shown to the user for his selection. The user selects one or more scan parameters. For instance, As shown in FIG. 4B, the user selects a scan parameter '2-sided scanning' (marked as 406) to select an option '1-sided' scanning (marked as 408). The user may select one or more other scan parameters such as output color, contrast, edge contrast, resolution, and so on. For example, as shown in the user interface 410 of FIG. 4C, the user selects the scan parameter 'resolution' (marked as 412) to set the value of resolution at 200 dpi (marked as 414). Once the user selects these conventional scan parameters, he selects the feature of 'keyword-based scanning' as disclosed by the present disclosure. To select this feature, the user selects a scan parameter 'keyword search' (marked as 416), as shown in user interface 420 of FIG. 4D. Once the user selects the option of keyword searching 416, the user inputs one or more keywords in a blank box (marked as 432) of the user interface 430 (as shown in FIG. 4E). Based on the input keywords, one or more pages of the document having the input keywords are identified and segregated from the remaining pages of the document. As a result, multiple scanned files are generated as explained in above examples. The user can then store these scanned files to his laptop.

Figure 4F:
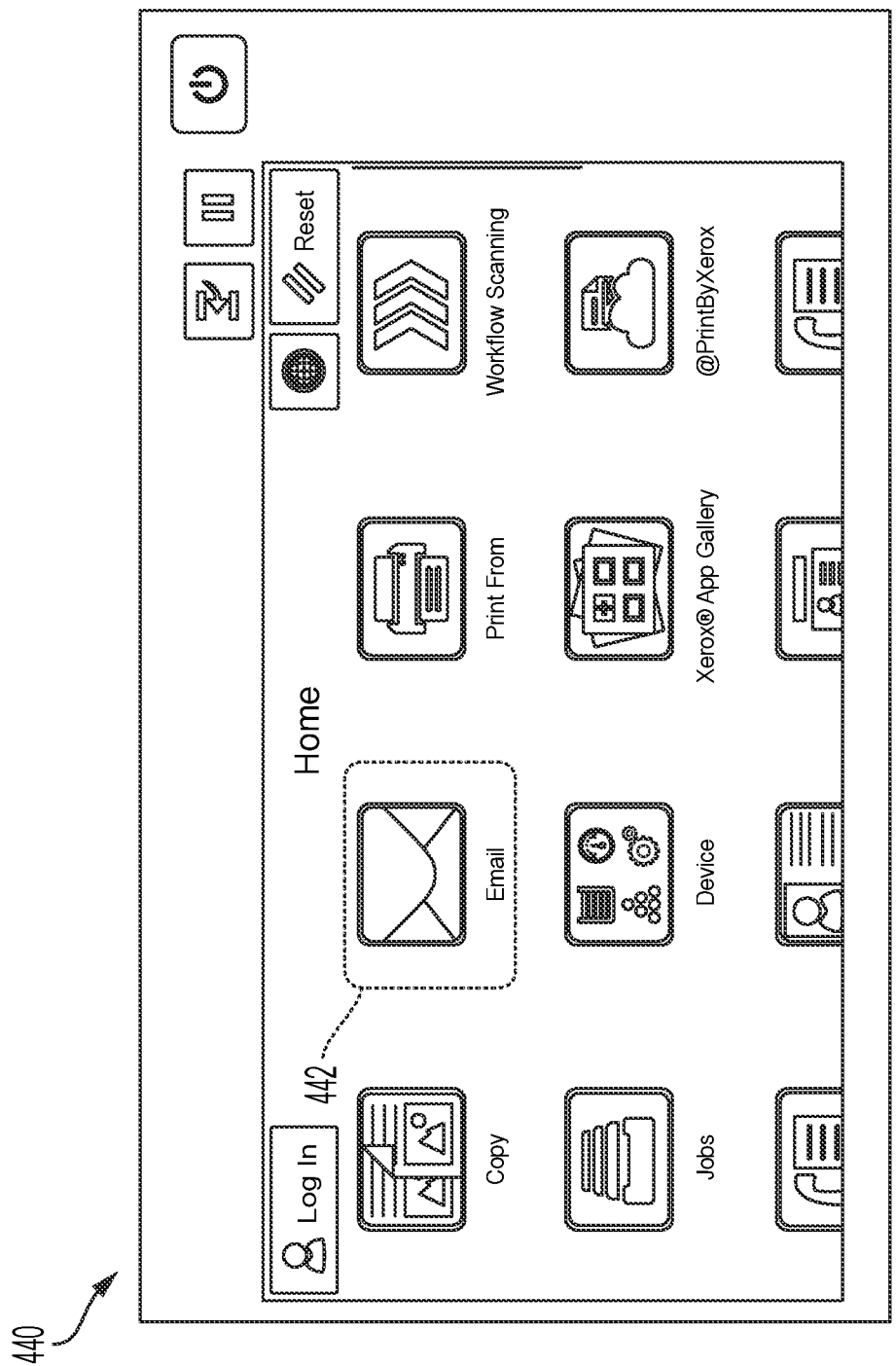
Figure 4G:
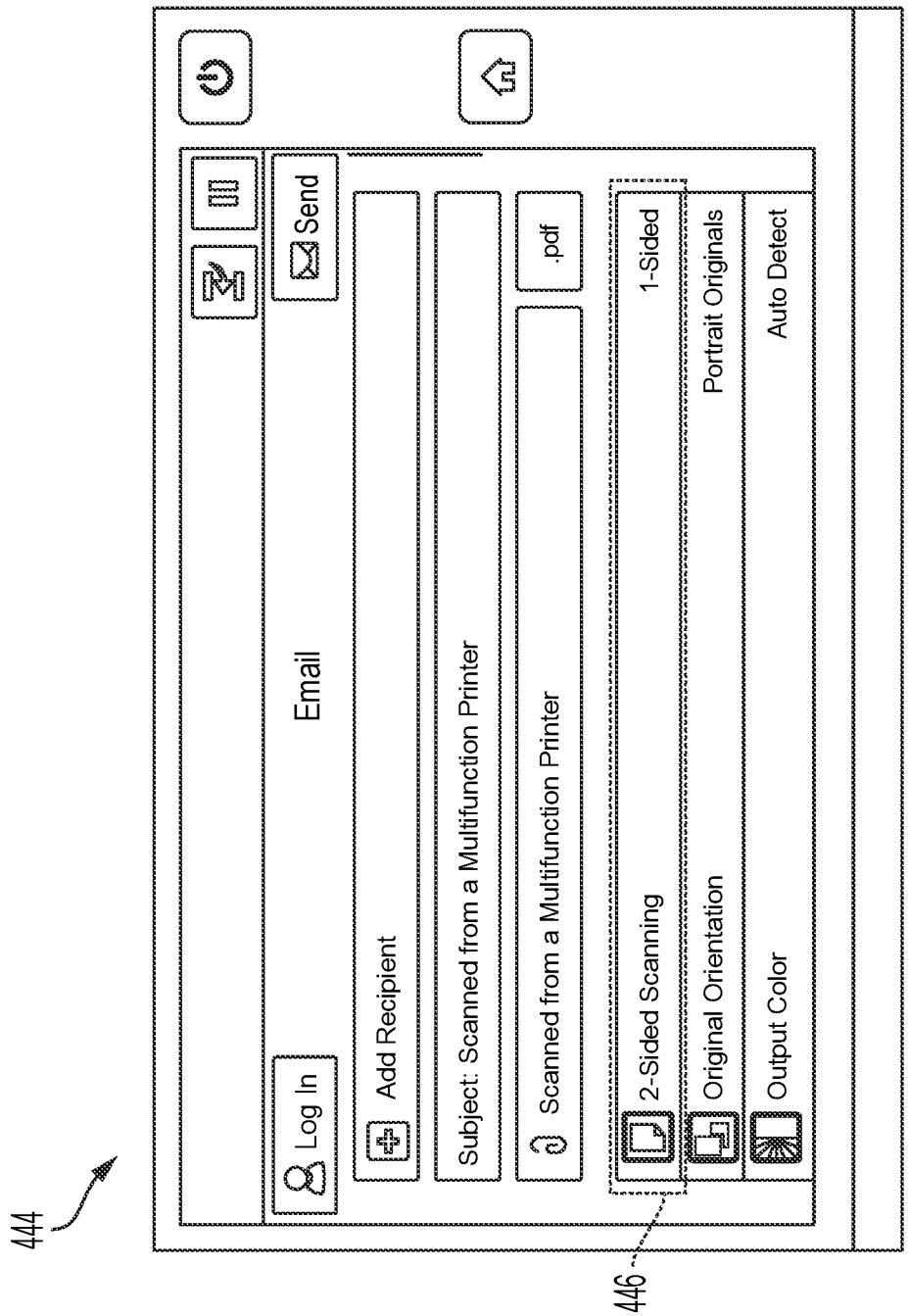
Figure 4H:
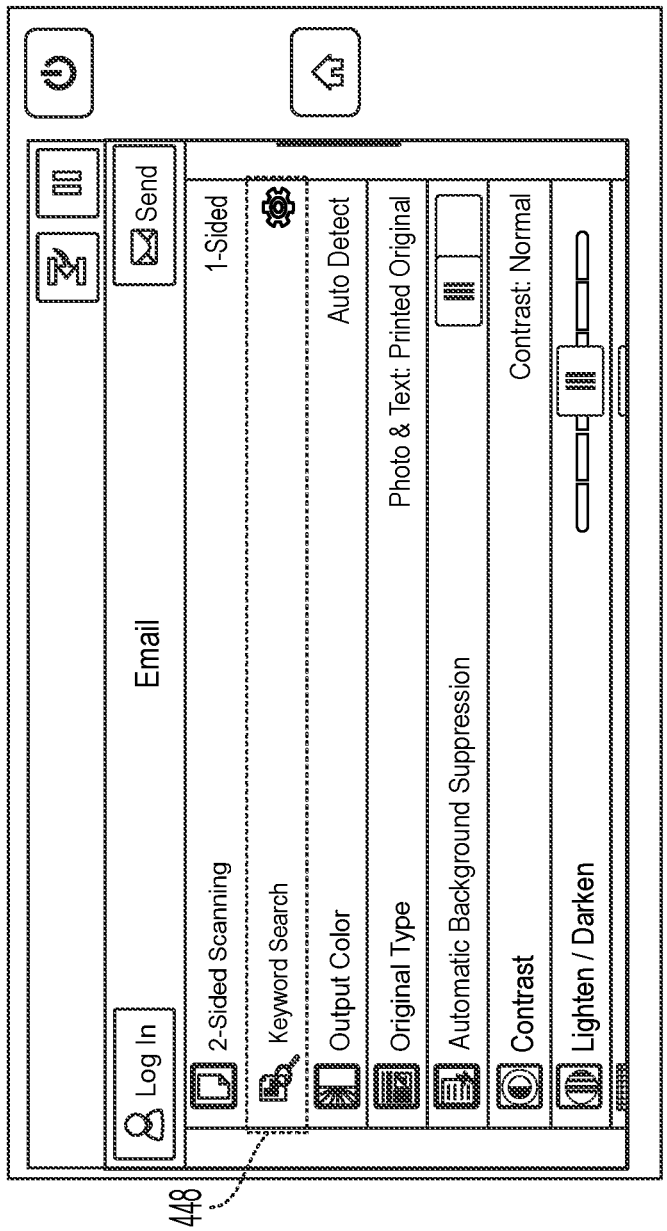
Figure 4I:
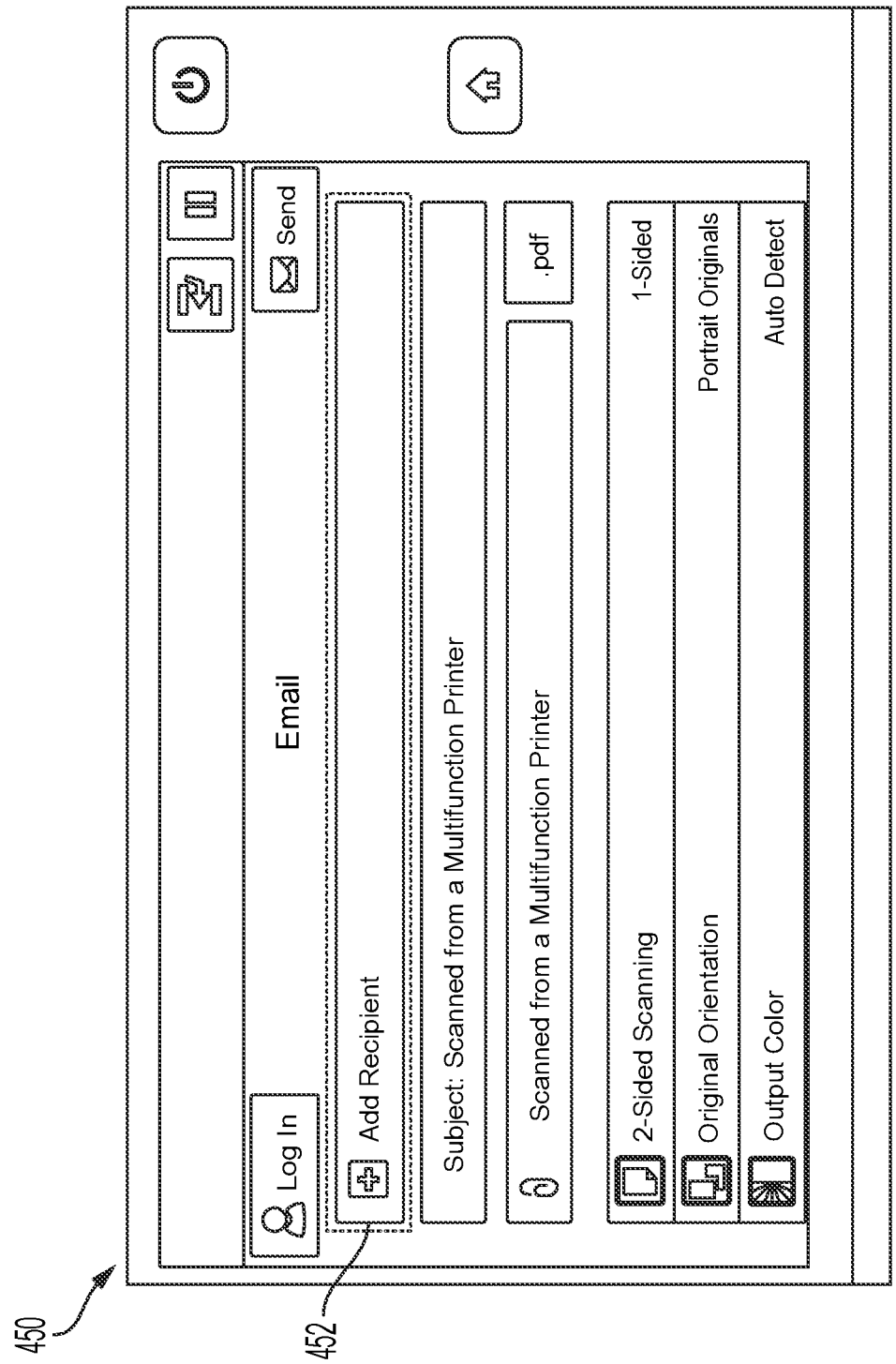
Figure 4J:
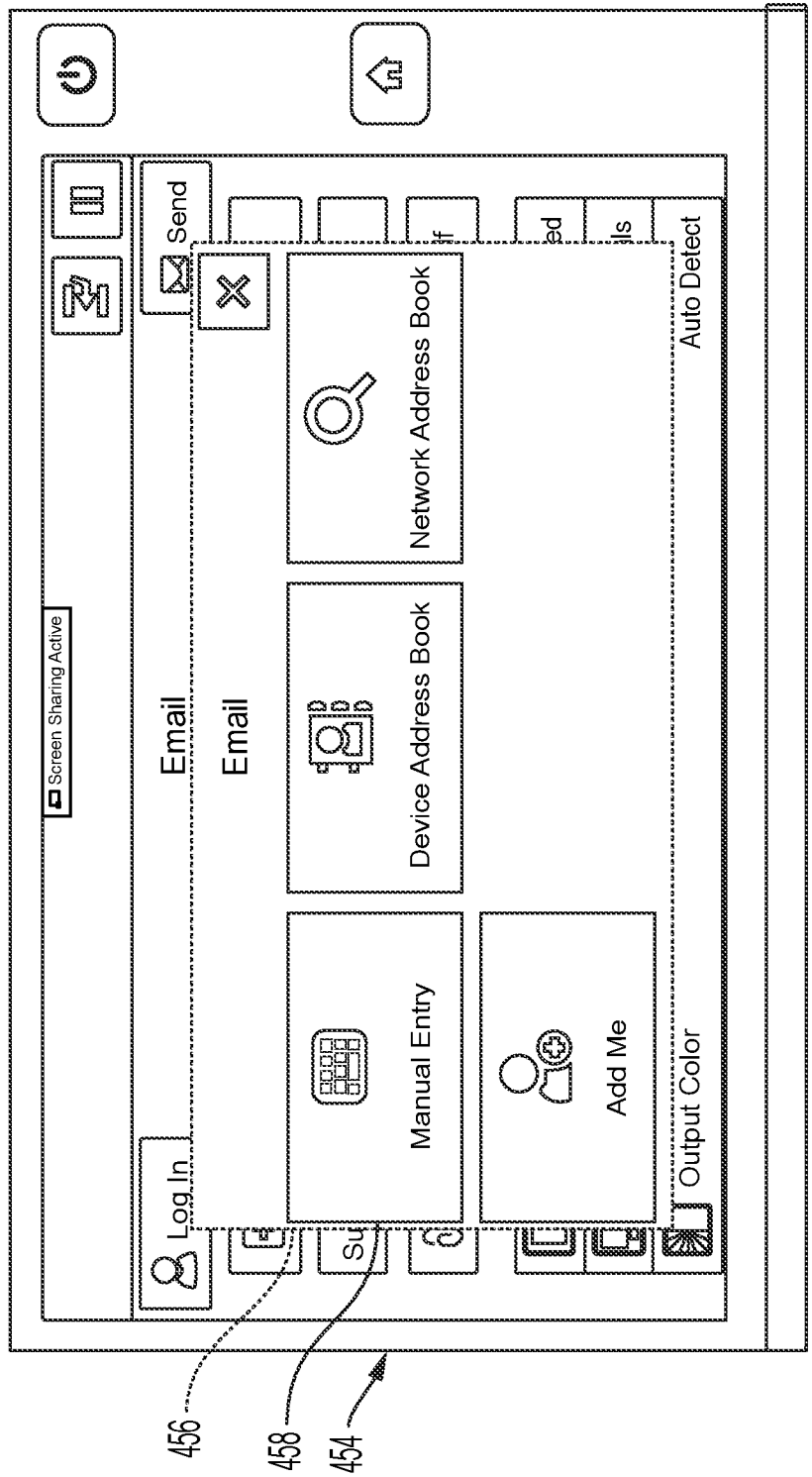
Figure 4K:
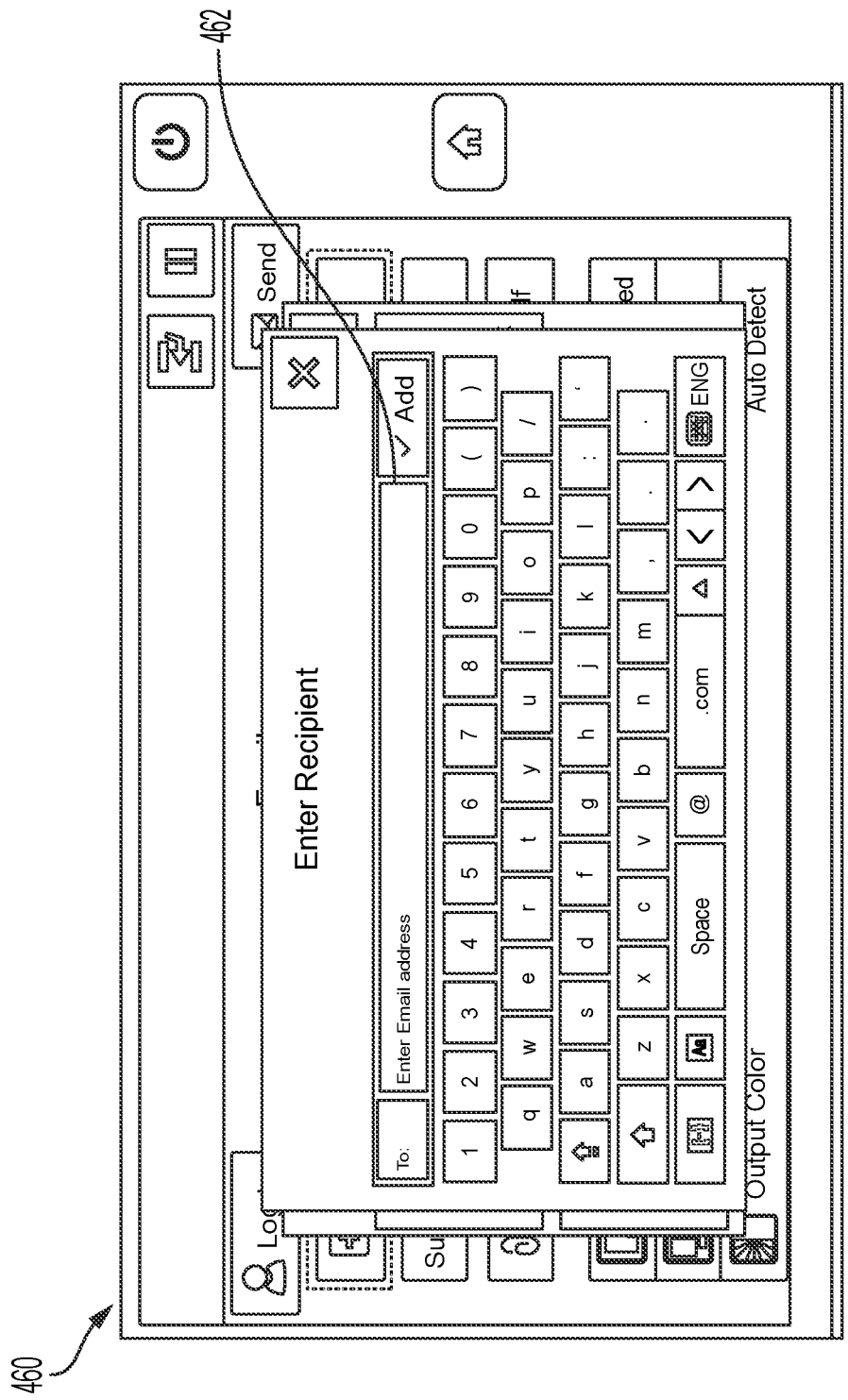

In the second scenario, the user wishes to generate multiple scanned files from a document and email the generated multiple scanned files to one or more email recipients. To that end, the user selects an email application (marked as 442) via a user interface 440 (as shown in FIG. 4F). Upon selecting the feature 442, another user interface (marked as 444) including various scan parameters is shown to the user (as shown in FIG. 4G). Here, the user selects one or more scan parameters such as '2-sided scanning' (marked as 446). Other scan parameters that may be selected includes color contrast, resolution, contrast, and so on. At this stage, the user also selects a scan parameter 'keyword search' (marked as 448 in FIG. 4H). While not shown explicitly, the user inputs one or more keywords based on which the document can be segregated to generate multiple scanned files. Subsequently, a user interface 450 showing an option to add recipient (marked as 452) is displayed to the user, as shown in FIG. 4I. Upon clicking on the option 452, another user interface 454 showing various options (marked as 456) to add recipient is displayed to the user for his selection (as shown in FIG. 4J). As shown here, the user selects an option to manually enter (marked as 458) the email address to add the one or more recipients where the scanned files are to be sent. Subsequently, the user can add email address of recipient(s) in a blank box 462 (as shown in the user interface 460 of FIG. 4K). This way, the user can use present disclosure to generate multiple scanned files and send the files to one or more other users via email.

Exemplary Flowchart

Figure 5:
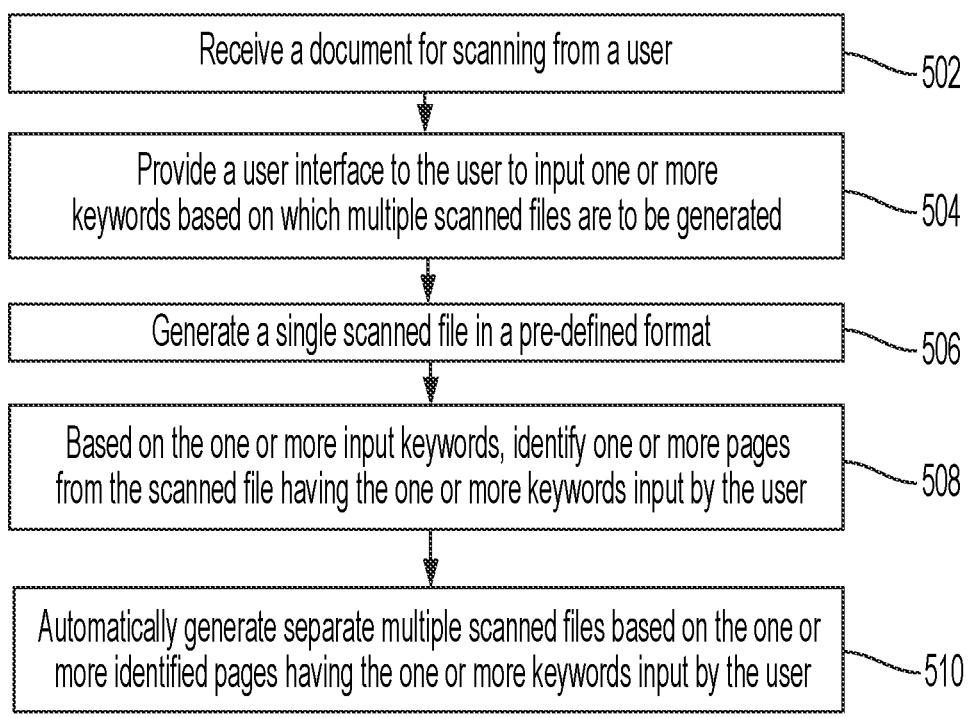
FIG. 5 is an exemplary method flowchart for generating multiple scanned documents based on keywords when scanning a document, in accordance with an embodiment of the present disclosure.

FIG. 5 is an exemplary method flowchart 500 for generating multiple scanned files based on keywords when scanning a document, in accordance with an embodiment of the present disclosure. The method 500 may be implemented at a multi-function device, such as the multi-function device 102 of FIG. 1, or the multi-function device 200 of FIG. 2. However, the method 500 can be implemented at any equivalent device with scan functionality.

The method begins when a user wishes to scan a document and generate multiple scanned files as an output. The document includes one or more pages. The user initiates the method by submitting the document for scanning at the multi-function device. For instance, the documents can be placed at an automatic document handler (ADH) of the multi-function device. Once submitted, the document is received for scanning from the user, at 502. Subsequently, at 504, a user interface is provided to the user that allows him to input one or more keywords. The one or more keywords can be one or more keywords of user's choice. Based on the input one or more keywords, multiple scanned files are to be generated. At this step, the user inputs may also select one or more additional scan parameters such as resolution, contrast, and so on.

Once the user submits the one or more keywords, the document along with the keywords are processed and a single scanned file is generated in a pre-defined format, at 506. The single scanned file is an image file, so file is first converted to a searchable format. An Optical Character Recognition (OCR) is performed to convert the file to a searchable format to identify the one or more matching keywords. In other words, the single scanned file is searched to identify availability of the one or more keywords that are either exact same or are related to the input keywords. For example, if a user input 'sign' as a keyword, the OCR is performed to identify matching keywords such as 'sign', 'signature' and any image that looks similar to a sign. Subsequently, at 508, one or more pages from the single scanned file having the one or more keywords input by the user are identified.

Based on the identified pages including the keywords, the pages including the one or more keywords are segregated from the remaining pages of the document. Once segregated, the one or more pages including the input keywords are combined to generate one scanned file and the remaining pages of the single scanned file are combined to generate another scanned file. At this stage, the user can also remove the one or more pages including the input keywords if he wishes to generate a single scanned file that do not include the input keywords. Alternatively, the user can delete the one or more pages that do not include the keywords to obtain the output file including input keywords.

While generating multiple scanned files, the input keywords along with the user inputs on types of scanned files to be generated are analyzed. For example, if a user has submitted a 100-page document and provided an input to generate only one file having pages including the keyword "confidential", the pages identified to include the keyword 'confidential' are combined to generate the output/scanned file. Therefore, although all the 100 pages are scanned to generate a single scanned file at 506, the pages that include the word "confidential" are only combined to generate the output scanned file.

Based on user selection of keywords and scanned file(s) to be generated, at 510, multiple scanned files are generated based on identification of pages including the one or more keywords. This way, the method 500 facilitates automatic generation of scanned files based on user input keyword(s).

Another way of generating the multiple scanned files can be—combining the one or more pages having the one or more keywords to generate a first scanned file and combining the remaining pages of the scanned file to generate a second scanned file. In yet another example, the one or more pages having the one or more keywords can be removed from the single scanned file. In this example, only the remaining pages are combined to generate a scanned file.

The method 500 may include additional steps such as a step of displaying a preview of the generated multiple scanned files for user's confirmation. At this stage, user can make changes in the input keywords, etc. to change the output files that are to be generated. Also, the user confirms the multiple scanned files that are to be generated.

Once the user confirms, the multiple scanned files are generated, and the user can send the scanned files to one or more destinations. For instance, the user can send one scanned file at a first destination such as email, cloud location, and so on. And the user sends another scanned file to a second location such as USB driver, network laptop, and so on. The user may also opt to send all the generated scanned files to a common destination. The scanned files may be automatically stored in the memory of the multi-function device for later usage.

One example is now discussed to explain the method 500 in more details. In this example, a user wishes to scan a 50-page document to specifically generate two files—one including a keyword 'chart' and another excluding the keyword. The user provides his input and initiates scanning of the document. First, a single scanned document is generated. This is a temporary file that is used at a back end to identify pages including the input keyword 'chart'. Once the single scanned document is generated, the document is searched to identify one or more pages including the matching keyword. If the page numbers 10-20 are identified to include the keyword 'chart' or other matching keywords such as 'charts', 'diagram', 'figure', etc., the pages numbers are segregated from the remaining page number (i.e., 1-9, 21-50) of the document. In other words, the document is segregated into two parts—first part including the page numbers 1-9, 21-50 and a second part including the page numbers 10-20. Thereafter, two respective scanned files are generated, if the user provided an input to generate the files including and excluding the keyword. In other scenario, where the user just requested to generate a scanned file including the input keyword, only one scanned file is generated (i.e., file including page numbers 10-20, the one including the keyword 'chart). Before generating the files, the user gets to see the preview of multiple scanned files. Once he confirms, the multiple files are generated as an outcome of single scan activity.

The present disclosure discloses methods and systems for generating multiple scanned files from a single document and scan activity. The methods and systems allow segregation of the document into multiple files based on user inputs. The segregation of the document is performed by the multi-function device and no third-party tool is required to create scanned files. Once the user input one or more keywords to segregate the document into multiple files no human intervention is involved. This way the present disclosure facilitates automatic segregation of one or more multi-page documents into multiple individual scanned documents/files with minimal user efforts. The methods and systems also recognize signature or other images as input keywords to segregate the document into multiple scanned files. This way, pages of a document that are to be signed by a governed authority can be segregated in easy steps.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the following discussion, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer readable tangible, non-transitory medium or also referred to as a processor-readable medium. For example, a server can include one or more computers operating as a web server, database server, or other type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as receiving, scanning, generating, identifying, segregating, combining, deleting, displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in a transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for generating multiple scanned files based on keywords when scanning a document at a multi-function device, the method comprising:
   receiving, by the multi-function device, a document for scanning:
   providing, by the multi-function device, a user interface configured to receive input of one or more keywords based on which multiple scanned files are to be generated;
   generating, by the multi-function device, an initial scanned file in a pre-defined format;
   based on the one or more input keywords, identifying, by the multi-function device, one or more pages from the initial scanned file having the one or more input keywords; and
   in response to the identifying the one or more pages from the initial scanned file having the one or more input keywords, automatically generating, by the multi-function device, at least three separate output scanned files, wherein the at least three separate output scanned files comprise:
   one output scanned file comprising the one or more identified pages having the one or more input keywords,
   another output scanned file comprising the remaining pages of the initial scanned file excluding the one or more input keywords, and
   yet another output scanned file comprising all of the pages of the initial scanned file in a same order as that of the initial scanned file.

2. The method of claim 1, further comprising, performing an Optical Character Recognition (OCR) to identify the one or more matching keywords from the initial scanned file.

3. The method of claim 1, further comprising, segregating the one or more pages having the one or more keywords from the remaining pages of the initial scanned file.

4. The method of claim 1, further comprising, removing the one or more pages having the identified one or more keywords from the initial scanned file.

5. The method of claim 1, further comprising, displaying a preview of the at least three separate output scanned files for confirmation.

6. The method of claim 1, wherein the one or more keywords comprise the one or more keywords to be included and the one or more keywords to be excluded.

7. The method of claim 1, wherein the one or more keywords comprise at least one of: at least one keyword, and at least one image of a signature.

8. The method of claim 7, wherein the signature is directly provided through the user interface of the multi-function device or the signature is uploaded at the multi-function device.

9. The method of claim 1, further comprising, allowing the user to send the at least three separate output scanned files to one or more different destinations.

10. The method of claim 1, wherein the method is implemented in the form of a non-transitory computer readable medium.

11. A multi-function device for generating multiple scanned files based on keywords when scanning a document, the multi-function device comprising:
- a receiver configured to receive for receiving a document for scanning:
- a user interface configured to receive input of one or more keywords based on which multiple scanned files are to be generated;
- a scanner configured to scan for scanning the document and generate an initial scanned file in a pre-defined format; and
- processor configured to:
  - based on the one or more input keywords, identify one or more pages from the single initial scanned file having the one or more input keywords; and
  - in response to the identifying the one or more pages from the initial scanned file having the one or more input keywords, automatically generate at least three separate output scanned files, wherein the at least three separate scanned files comprise:
    - one output scanned file comprising the one or more identified pages having the one or more input keywords,
    - another output scanned file comprising the remaining pages of the initial scanned file excluding the one or more input keywords, and
    - yet another output scanned file comprising all of the pages of the initial scanned file in a same order as that of the initial scanned file.

12. The multi-function device of claim 11, further comprising, an Optical Character Recognition (OCR) module for identifying the one or more matching keywords from the initial scanned file.

13. The multi-function device of claim 11, wherein the processor is configured to identify and segregate one or more pages from the initial scanned file having the one or more keywords from the remaining pages of the initial scanned file.

14. The multi-function device of claim 11, wherein the processor is configured to remove the one or more pages having the identified one or more keywords from the initial scanned file.

15. The multi-function device of claim 11, wherein the processor is configured to cause display at the multi-function device of a preview of the at least three separate output scanned files.

16. The multi-function device of claim 11, wherein the one or more keywords comprise the one or more keywords to be included and the one or more keywords to be excluded.

* * * * *